Nov. 6, 1928.
F. S. HEBDEN
1,690,679
AUTOMATIC WEIGHING MECHANISM
Filed Feb. 25, 1927   5 Sheets-Sheet 1
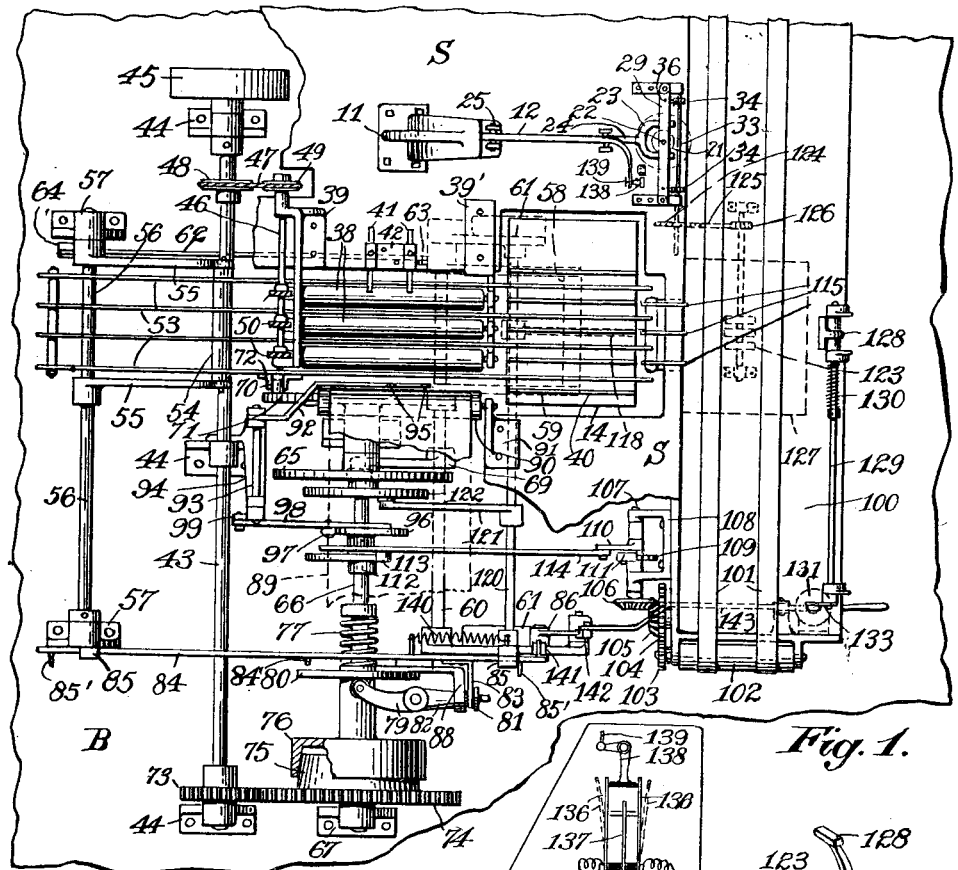
Fig. 1.
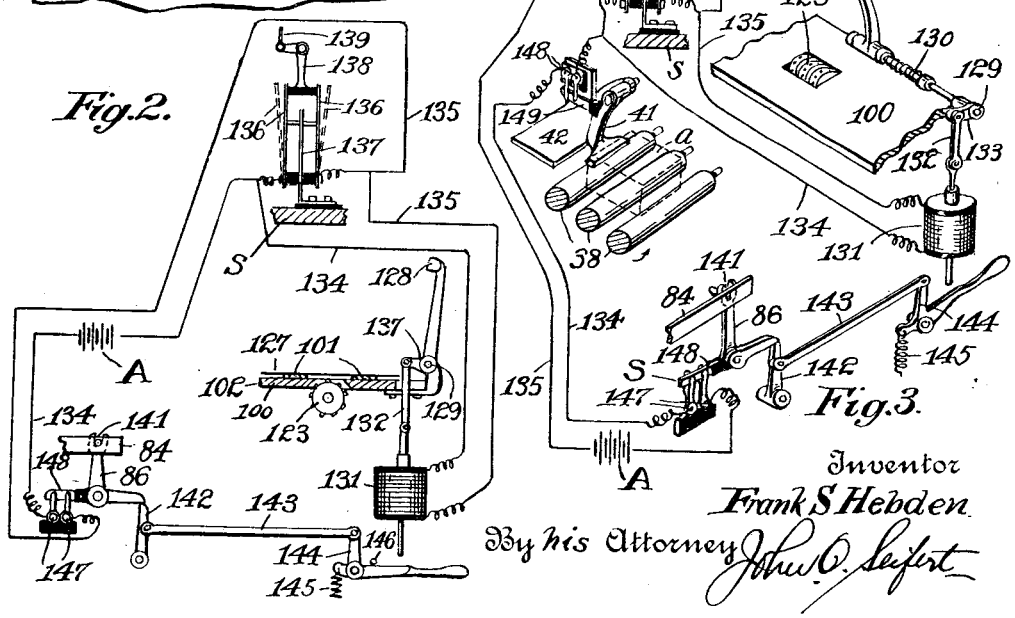
Fig. 2.
Fig. 3.
Inventor
Frank S Hebden
By his Attorney John C. Seifert Nov. 6, 1928.
F. S. HEBDEN
1,690,679
AUTOMATIC WEIGHING MECHANISM
Filed Feb. 25, 1927    5 Sheets-Sheet 2
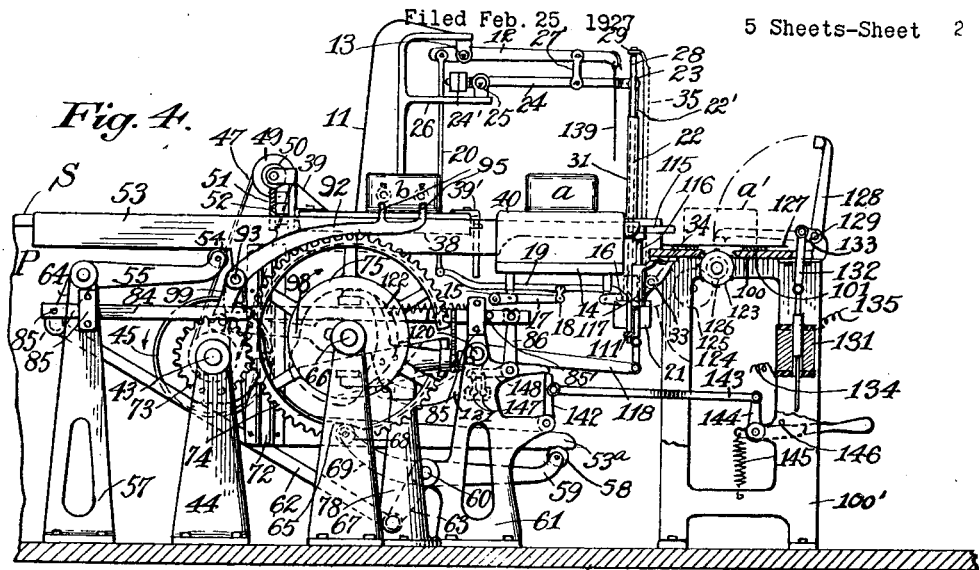
Fig. 4.
Fig. 4a.
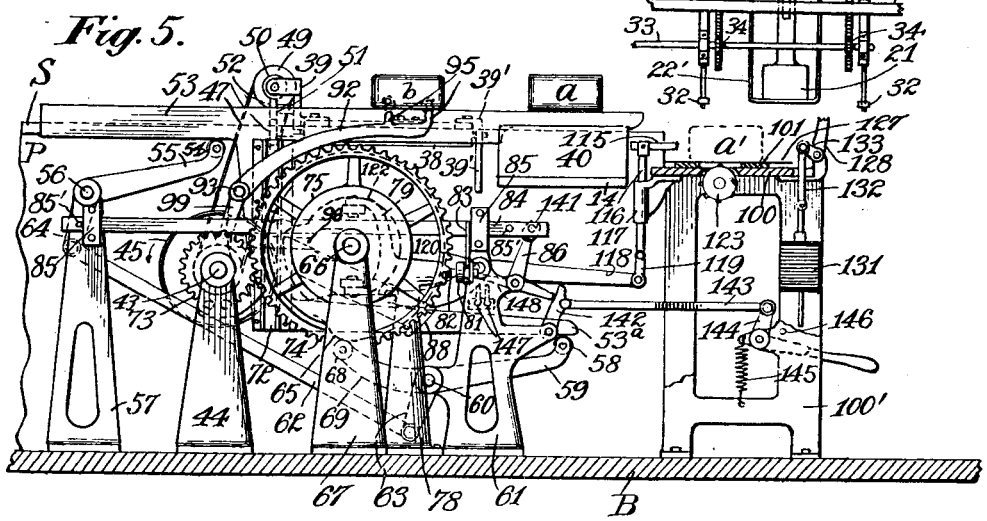
Fig. 5.
Inventor
Frank S. Hebden
By his Attorney John C. Seifert Nov. 6, 1928.
F. S. HEBDEN
1,690,679
AUTOMATIC WEIGHING MECHANISM
Filed Feb. 25, 1927    5 Sheets-Sheet 3
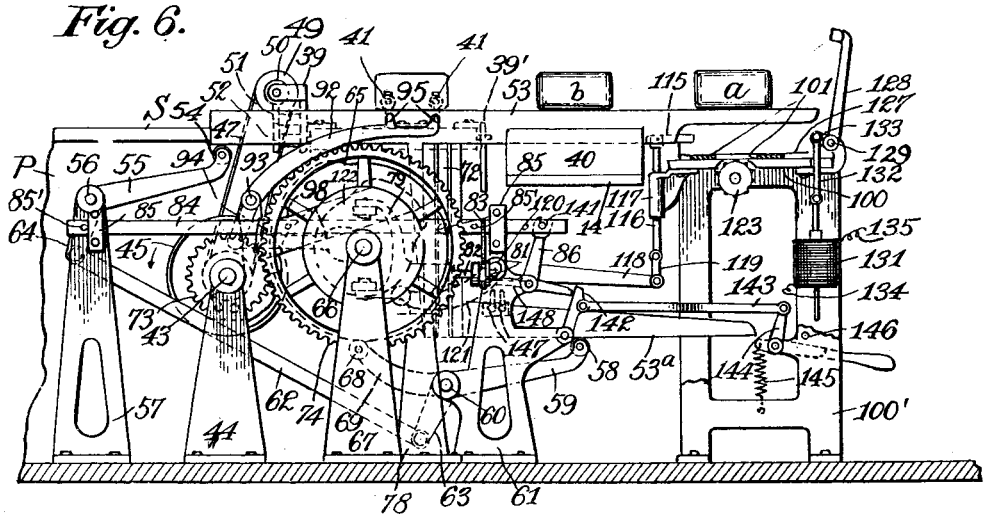
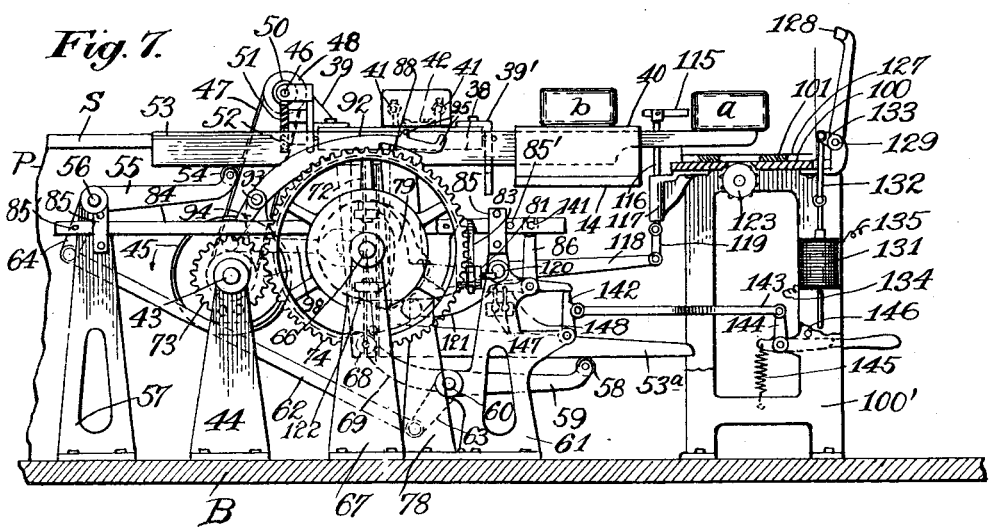
Inventor
Frank S. Hebden
By his Attorney Nov. 6, 1928.
F. S. HEBDEN
1,690,679
AUTOMATIC WEIGHING MECHANISM
Filed Feb. 25, 1927   5 Sheets-Sheet 4
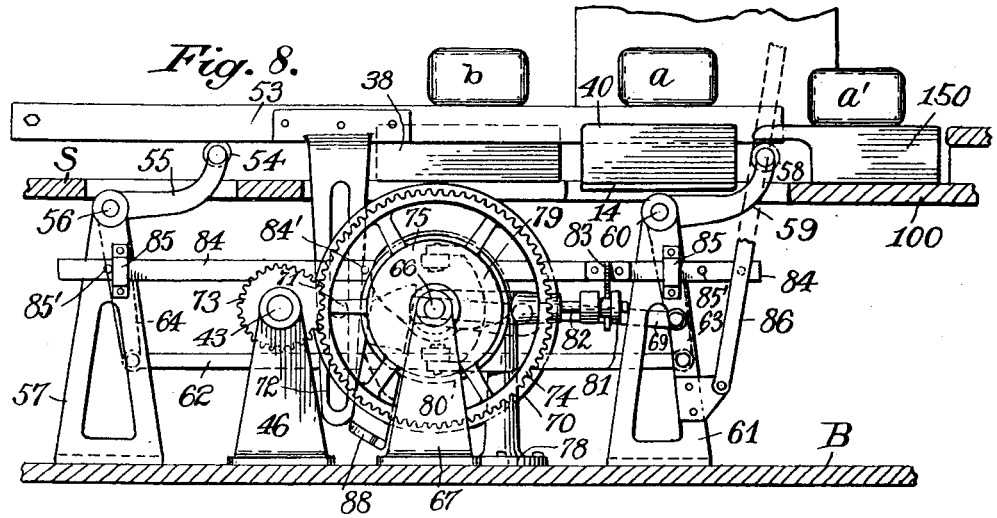
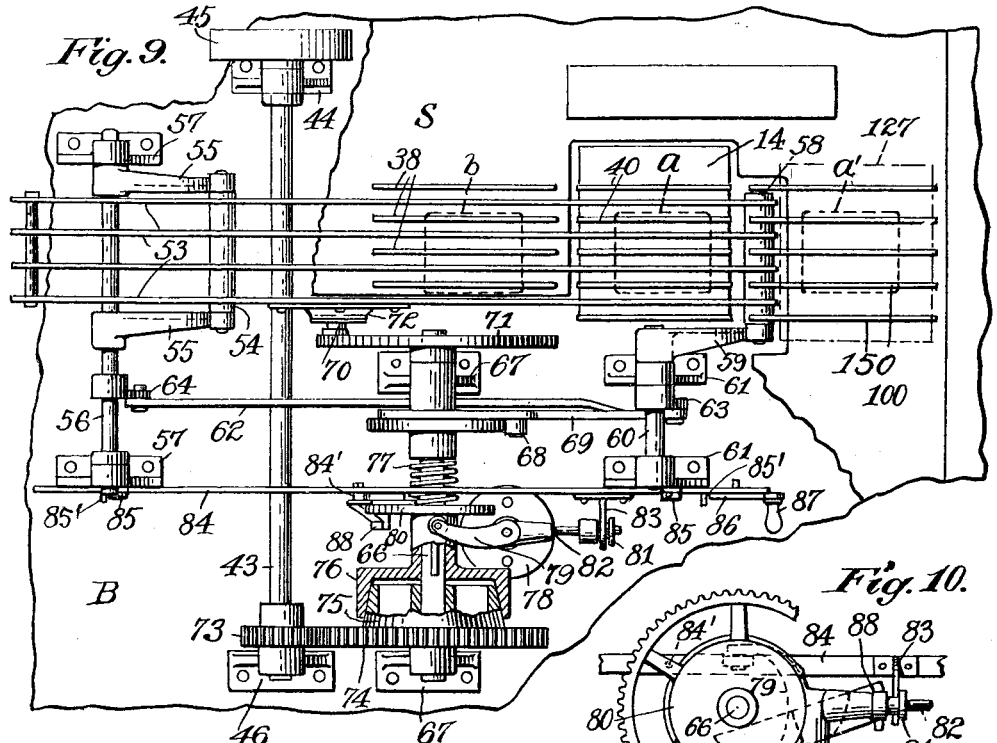
Inventor
Frank S. Hebden
By his Attorney

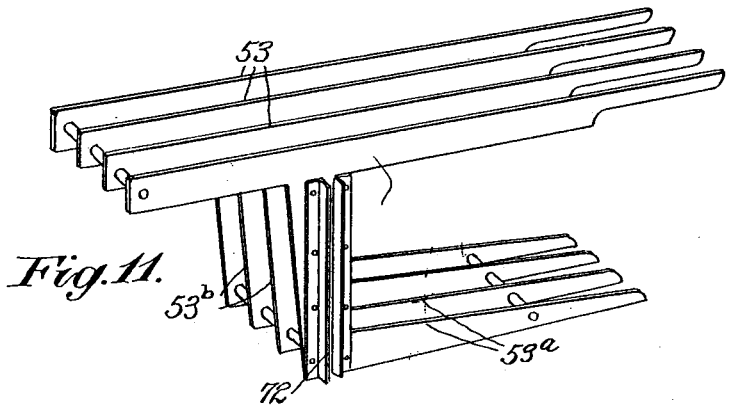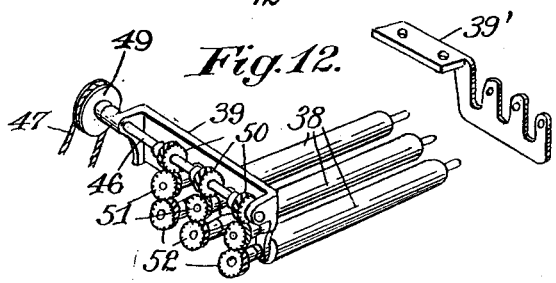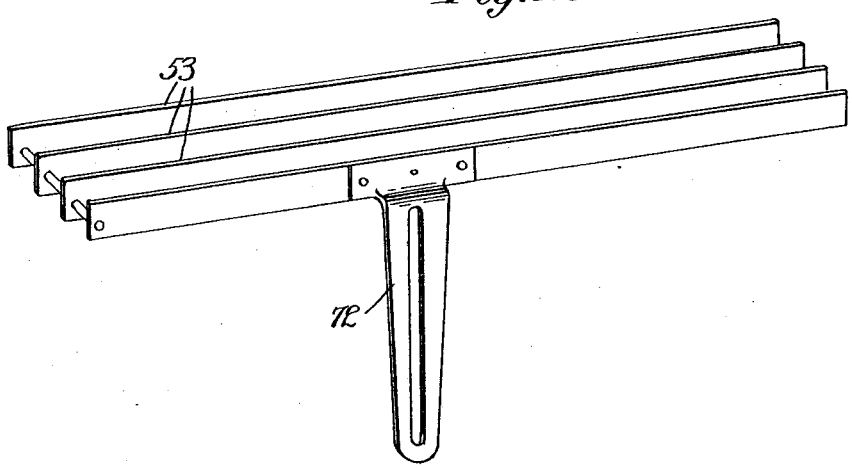

Patented Nov. 6, 1928.

1,690,679

UNITED STATES PATENT OFFICE.

FRANK S. HEBDEN, OF PASSAIC, NEW JERSEY, ASSIGNOR TO MERRICK SCALE MFG. COMPANY, OF PASSAIC, NEW JERSEY, A CORPORATION OF NEW JERSEY.

AUTOMATIC WEIGHING MECHANISM.

Application filed February 25, 1927. Serial No. 170,790.

This invention relates to weighing mechanism and means for registering and recording the weight of an article weighed, and it is the primary object of the invention to provide improved means of this character having combined therewith means to transfer an article to the weighing mechanism to be weighed, and after the article has been weighed to transfer the article from the weighing mechanism and simultaneously transfer another article to the weighing mechanism to be weighed, and to provide means for this purpose which is simple in construction and arrangement and efficient in use.

It is a further object of the invention to provide improved apparatus of this character entirely automatic in operation wherein the article transferring means is intermittently operative in that it is brought to rest or rendered inactive when an article has been transferred to the weighing mechanism the weighing mechanism automatically weighing the article, registering mechanism being operative from the weighing mechanism as it is brought to balance to register the weight of the load, and means being operative by the bringing of the weighing mechanism into balance to actuate means to make a record of the weight of the article from the registering means and also being operative to render the article transferring means active.

Another object of the invention is to provide conveying means to convey and position an article upon a support during the weighing of an article by the weighing mechanism to be transferred to the weighing mechanism upon a successive operation of the transferring means to transfer an article from the weighing mechanism, and provide a support relative to which the registering and record making means is arranged for the positioning and supporting of a sheet for a weighed article, to constitute the wrapper therefor and upon which sheet a record of the net weight of an article is made to be visible when the article is wrapped in said sheet, and upon which sheet upon the support an article is delivered as it is transferred from the weighing mechanism, and to provide a second conveyer in relation to said support to convey an article upon the wrapping sheet from said support.

Other objects and advantages will hereinafter appear.

In the drawings accompanying and forming a part of this specification Figure 1 is a plan view of an embodiment of the invention showing the article transferring means combined with automatic weighing mechanism.

Figure 2 is a diagrammatic view of an electric circuit having connected therein electromagnetically operated means controlled by the weighing mechanism as it is brought to position of balance to render the weight recording means and the article transferring means active.

Figure 3 is a view similar to Figure 2 showing a modified means and electric circuit of the electromagnetically operated means for rendering the recording means and article transferring means active.

Figure 4 is a front elevation looking at the bottom of Figure 1, partly in section, and showing the parts with the article transferring means inactive and an article being weighed.

Figure 4ª is a detail view in elevation of a compensating variable resistance forming a part of the weighing mechanism to offset a load applied to the weighing mechanism and the means connected to the weighing mechanism for actuating the registering mechanism during the movement of the weighing mechanism to position of balance.

Figure 5 is a view similar to Figure 4, partly in section and with portions of the weighing mechanism removed, showing the article transferring means in position to transfer an article from the weighing mechanism and another article to the weighing mechanism.

Figure 6 is a view similar to Figure 5 and showing the article transferring means in position to transfer an article from the weighing mechanism relative to the registering and recording means and a successive article to the weighing mechanism.

Figure 7 is a view similar to Figure 6 showing the article transferring means in position to deposit a successive article upon the weighing mechanism and the article transferred from the weighing mechanism on the transferring means positioned relative to registering and recording means with means positioned relative to said article to strip the same from the transferring means to deliver it to a support relative to which the registering and recording means is arranged upon the successive actuation of the transferring means.

Figure 8 is a front elevational view of a modified arrangement of an article transferring means only combined with weighing mechanism, only a portion of the weighing mechanism being shown.

Figure 9 is a plan view of the article transferring means shown in Figure 8 in relation to article receiving means of the weighing mechanism.

Figure 10 is detail view of means controlled by the weighing mechanism as it is brought into balance for releasably connecting the article transferring means to the driving means therefor.

Figure 11 is a perspective view of the article transferring means utilized in the arrangement of apparatus shown in Figures 1 and 4 to 7.

Figure 12 is a perspective view, partly dissembled, of the roller support in the structure of Figures 1 and 4 to 7 to receive an article from a conveyer and position the same relative to the transferring means to show the mounting of said rollers and the actuating means therefor; and Figure 13 is a perspective view of the transferring means utilized in the structure of apparatus shown in Figures 8 and 9.

In carrying out the invention the weighing mechanism is carried by a standard 11 mounted on a shelf S constituting a part of the framework and carried by a vertical plate rising from the base B of said framework with the shelf in superposed relation to said base.

The weighing mechanism comprises the usual steelyard or beam 12 fulcrumed or pivotally supported in a laterally extending portion of the standard 11, as at 13, and having an article or load receiver 14 connected thereto, said receiver being carried by arms on a pair of rock shafts 15, 16 pivotally mounted upon the vertical wall of the framework and connected with the beam 12 by a lever 17 fixed to the arm 15 having a link connection 18 intermediate the ends of a lever 19 fixed at one end to the shaft 16 and having a link connection 20 with the beam. To weigh an article or load upon the receiver 14 a suitable form of resistance is provided and shown as a compensating variable resistance as disclosed in Letters Patent No. 1,490,270 issued April 15, 1924, and embodying a combined mercury carrying pot 21 and a displacement member 22 to operate in the mercury in the pot. The pot is carried by a yoke member 22′ pivotally connected to the legs of a bifurcation 23 at the end of an auxiliary beam 24 having a fulcrum or pivotal support, as at 25, on shelf 26 extending laterally from the standard 11 and having a link connection 27 with the beam 12. The rod or plunger 22 is adapted to have movement into and out of the mercury in the pot, said rod being secured at the upper end to and carried by a crossbar 29 connected at opposite ends to rods 28 slidably engaging in openings at the upper and lower ends of vertical guide members 31 fixed upon the shelf S, the rods having collars 32 fixed to the lower ends to prevent accidental withdrawal of the rods from the guide members. The movement of the plunger 22 beyond a normal depth into a displacement of the mercury in the pot acts as the addition of weight to the beam to counterbalance the weight of the article, and the withdrawal of the plunger acts in a manner to subtract weight from the beam. To move the plunger into and out of the mercury in the pot to counterbalance a load, means are pivoted to impart said movement to the plunger controlled by the movement of the weighing mechanism out of equilibrium by means having a connection 139 with the beam 12 as illustrated and described in the patent hereinbefore mentioned, and to which means the plunger is operatively connected by a shaft 33 journaled in brackets on the guide members 31 and having pinions 34 thereon to mesh with racks 35 secured at one end, as at 36, to the crossbar 29.

To effect weighing of successive articles automatically an article support is juxtaposed to the weighing mechanism, and shown in Figures 1, 4 and 5 as comprising a series of three rollers 38 rotatably carried in brackets 39, 39′ mounted upon the shelf S in parallel and spaced relation at one side of the article receiver 14 of the weighing mechanism to extend in line with parallel and spaced members 40 extending upward from the article receiver 14. These rollers are continuously rotated to position an article placed thereon relative to pins 41 adjustably mounted in a bracket 42 fixed upon the shelf S to project toward the rollers. The rollers are rotated from a shaft 43 journaled in standards 44 fixed upon the base plate of the framework and driven from a suitable source of power by a belt (not shown) passing around a pulley 45 on said shaft. A shaft 46 journaled in the roller supporting bracket 39 is driven from shaft 43 by a belt 47 passing around pulleys 48, 49 on the shafts 43, 46 respectively, and the shaft 46 operatively connected with the rollers by spiral gears 50 on said shaft meshing with similar gears 51 rotatably mounted on studs fixed on the bracket 39, and said latter gears meshing with similar gears 52 on the shafts of the rollers. (Figure 12.)

An article on the roller support 38 is transferred to the article receiver of the weighing mechanism and from the latter by article transferring means intermittently operative to lift an article from the roller support 38 and transport such article to and deposit it on the receiver of the weighing mechanism, and simultaneously therewith lift an article from the receiver of the weighing mechanism which article was previously transported to and deposited on said receiver to deliver the weighed article therefrom, said means comprising a series of connected parallel and spaced bars 53 supported adjacent one end by a roller 54 carried by a pair of arms 55 fixed to a rock shaft 56 journaled in standards 57 fixed upon the base plate B, and at the opposite ends by a roller 58 carried by arms 59 fixed to a rock shaft 60 journaled in standards 61 fixed upon the base plate B, and said arms being interconnected by a link 62 pivotally connected at one end to an arm 63 fixed to the shaft 60 and an arm 64 fixed to the shaft 56. The roller 58 is arranged below and engages with auxiliary bars 53ª carried by downwardly extending portions 53ᵇ of the bars 53 to extend in parallel relation with said bars. The bars 53 are normally positioned to engage within the spaces or recesses between and below the upper surface of the supporting rollers 38 and the members 40 of the article receiver of the weighing mechanism to permit of an article to be supported upon the rollers and said members 40, movement being imparted to the bars 53 to lift or move the same upward and outward from said spaces and lift an article from the rollers and receiver and downward into said spaces to deposit an article upon the receiver by a cam 65 fixed to a shaft 66 rotatably mounted in standards 67, fixed upon the base plate B co-operating with a cam following roller 68 rotatably carried by an arm 69 fixed to the shaft 60.

Forward movement is imparted to the transferring means to transfer an article lifted from the rollers 38 to the receiver of the weighing mechanism and transfer an article from the latter and rearward movement after the transfer bars have been lowered into the spaces between the upwardly extending members of the receiver and rollers by a pin 70 (Figure 1) fixed in and extending from a disk 71 fixed to the shaft 66 with the pin in eccentric relation to the axis of the shaft, engaging in a vertical slideway 72, formed by a pair of angle pieces fixed to the member 53ᵇ of the front transfer bar 53. (Figure 11.)

The shaft 66 is intermittently rotated from the driving means or shaft 43 by a pinion 73 meshing with a gear 74 connected with one member 75 of a clutch of the cone type, said gear and clutch being loose upon shaft 66 and connected to said shaft by the other member 76 of the clutch having a key connection with the shaft, as shown in Figure 9, whereby said clutch member is adapted to rotate and have sliding movement on the shaft and normally urged to operative clutching position by a spring 77 coiled about the shaft and confined between the hub of said clutch member and a collar fixed to the shaft.

To release the shaft 66 from the driving means 43 and intermittently impart article transferring movement to transferring means, means are provided to move the clutch member 76 to inoperative or uncoupling position. For this purpose there is provided a cam shifter in the form of a lever pivotally supported on a standard 78 mounted upon the base plate B to have movement on an axis transverse to the axis of the shaft, one arm 79 of said lever being bifurcated and straddling the hub of clutch member 76 and each leg of the bifurcation carrying a roller engaging a disk 80 fixed to the hub of clutch member 76 to rotate with the shaft, said disk with the rollers carried by the shifter bearing against the same also serves as a braking means to retard the movement of the shaft when it is disconnected from the driver 43. A sleeve 81 having an annular recess is slidably and rotatably mounted on an extension of the other arm 82 of the shifter lever and adapted to be adjusted thereon by a second shifter comprising a bifurcated member 83 straddling and engaging in the annular recessed portion of the sleeve, said bifurcated member being fixed to and extending laterally from a rod 84 mounted for longitudinal sliding movement on one of the standards 57 and 61, as at 85. The shifter rod 84 is longitudinally adjusted by a lever 86 pivotally connected to said rod and pivotally mounted upon a standard 61, said lever 86 when adapted for manual operation being provided with a hand grip 87 on an extended part as shown in Figures 8 and 9. By the adjustment of the rod 84 the sleeve 81 is adjusted on the shifter arm to position the same into and out of the path of movement of a cam member 88 rotatable with the shaft 66. In normal position the sleeve is adjusted to the position shown in Figures 1 and 10 in which position it is engaged by the cam member 88 as it is revolved with the shaft 66, the engagement of the cam member with said sleeve rocking the clutch shifter 79 and thereby moving the clutch member 76 to uncoupling position against the tension of spring 77. To start the apparatus the shifter rod 84 is manually operated to adjust the sleeve 81 to the position shown in Figure 9 releasing the cam member 88 therefrom and permitting the clutch member 76 to move to operative clutching position and operatively connecting the actuating means for the transferring means with the shaft 43 for actuation thereby. When the sleeve 81 of the clutch shifter is released from the cam 88 the shifter rod 84 is again actuated to adjust the sleeve on the shifter arm in a direction toward the axis of the shifter in position for engagement by the cam 88 upon the completion of a revolution of the shaft 66 to actuate the clutch to uncouple the transferring means from the driving means by the cam member 88 engaging with a roller or pin 84' extending laterally from the shifter rod 84.

The articles are automatically delivered to the article supporting rollers 38 by a conveyer belt 89 shown for clearance of illustration of other parts partly in full lines and partly in dash lines in Figure 1, said conveyer belt passing around a drum 90 rotatably mounted in parallel and spaced relation to the rollers 38 in a bracket 91 fixed upon the shelf S and an arm (not shown) on inner shaft supporting standard 67.

To prevent more than one article being delivered to the supporting rollers 38 stop mechanism is interposed between the conveyer belt carrying roller 90 and the first roller of the article supporting rollers 38 to intercept the delivery of articles from the conveyer belt when an article is upon the supporting rollers and during the period of transferring of an article from said rollers to the receiver of the weighing mechanism, and operative during the movement of the transferring means to initial position and before the shaft 66 is uncoupled from the driving means and brought to rest. This stop mechanism comprises a curved arm 92 fixed at one end upon a rock shaft 93 journaled in a bracket 94 fixed to the intermediate supporting standard 44 for the shaft 43. At the other extremity the arm is arranged with spaced projections 95 extending laterally from the outer curved edge. This stop arm is actuated in proper timed sequence with the transferring means by a cam 96 on shaft 66 with which a roller 97 mounted on a carrier 98 having a bifurcation at one end to straddle the shaft 66 and pivotally connected at the free end with an arm 99 fixed on the rocker shaft 93.

To transport the article delivered from the receiver of the weighing mechanism to a point remote therefrom a second support 100 is provided at the side of the receiver 14 opposite to the supporting rollers 38, said support being mounted on standards 100' relative to which a conveyer is movable, said conveyer comprising a pair of spaced parallel belts 101 passing around drums 102 rotatably carried at opposite ends of the support, only one of said drums being shown, with the upper stretch of the belts lying contiguous to and moving over the table or support the lower stretch arranged below the table. This conveyer is operatively connected to and driven from the shaft 66 by a pinion 103 rotatable with the one conveyer drum 102 meshing with a gear 104 rotatably mounted on a stud fixed to and extending laterally from the standard 100' and having a bevel pinion 105 rotatable therewith meshing with a bevel pinion 106 fixed to a shaft 107 journaled in a bracket 108 fixed to the framework to extend below the supporting shelf S for the weighing mechanism. (Figure 1.) This shaft 107 has a ratchet wheel 109 fixed thereon with a lever 110 juxtaposed thereto pivotally carrying a pawl 111 to co-operate with the ratchet wheel, and said pawl carrying lever being rocked by a cam 112 on the shaft 66, a cam following roller 113 mounted on a carrier 114 having a bifurcation at one end to straddle the shaft 66 and pivotally connected at the opposite end with the pawl carrying lever 110, the roller co-operating with the cam to impart reciprocatory movement to the pawl carrying lever and thereby rotating the conveyer drum through the gearing connection thereof with the ratchet wheel carrying shaft.

After an article has been weighed upon the successive movement of the article transferring means the article, indicated at a in Figure 4, is lifted from the receiver of the weighing mechanism and simultaneously therewith an article b positioned upon the article support 38 is lifted therefrom by the upward movement of the transfer bars, as shown in Figure 5, and upon the forward movement of said transfer bars the articles are positioned as shown in Figure 6, and upon the downward movement of the transferring means the article b is deposited upon the receiver of the weighing mechanism and article a positioned on the transfer bars above the support 100, as shown in Figure 7. During this downward movement of the transfer bars means to strip the article a from the transfer bars and deliver it to the support 100 upon the return movement of the transferring means to initial position is positioned in the rear of article a, said means comprising a series of fingers 115 extending in parallel relation to the transfer bars and carried by a rod 116 slidably mounted in a bracket 117 fixed to the bottom of and extending laterally from the support 100, the fingers being arranged in the spaces between the bars 53 of the transferring means and as the bars are moved downward upward movement is imparted to the finger carrying rod 116 by an arm 118 having a link connection 119 with said rod, said arm being fixed to a shaft 120 journaled in the standards 61 and rocked by an arm 121 fixed to the shaft 120 and carrying a roller to follow a cam 122 fixed to the shaft 66. As rearward movement is imparted to the transfer bars 53 the stripper fingers 115 will engage the article a and cause the same to be moved from said transfer bars onto the support 100, as shown in dotted lines at a' in Figure 4. As the transfer bars are moved downward the stop 92 is moved downward from article intercepting position to permit an article to be delievered from the conveyer 89 to the supporting rollers 38 during the return movement of the transferring means, and as an article is delivered from the conveyer said stop is again moved to intercepting position between the conveyer and supporting rollers.

As stated, it is an object of the invention to provide means to register the weight of the article weighed and to make a record of such weight, the present apparatus being particularly adapted for use in connection with means to print the net weight of an article on a wrapping sheet for the article. For this purpose registering mechanism is provided which may be of a conventional form embodying a series of wheels arranged with impression making digits, as shown in a conventional manner at 123, mounted upon the support 100 in relation to an opening therein and actuated from the shaft 33 of the load counterbalancing means of the weighing mechanism through a gear 124 fixed to said shaft meshing with a gear 125 and said latter gear meshing with a gear 126 on an extension of the shaft of the prime mover of the registering mechanism. The registering mechanism is actuated through the gear connection thereof with the counterbalancing means as the weighing mechanism is being brought into position of balance. To make a record from said registering mechanism of the weight of an article weighed by the weighing mechanism, as upon a wrapping sheet for such article, a wrapping sheet 127 is positioned upon the support 100 superposed to the registering mechanism. A hammer or platen 128 is fixed to a shaft 129 rotatably mounted in brackets fixed upon the support and said hammer adapted to have movement to impinge the same upon the sheet and the latter against the registering wheels to make an impression from the latter upon the sheet, suitable inking mechanism being interposed between the sheet and register wheels. The hammer is normally urged to position away from the support by a spring 130 coiled about the hammer carrying shaft having one end fixed to the shaft and the other end to a fixed part. Means are provided to impart impression making movement to said hammer just previous to the starting of the transferring means and controlled by the movement of the weighing mechanism to position of balance. In the present instance this hammer actuating means comprises electromagnetically operated means embodying a solenoid magnet 131 the core of which has a link connection 132 with an arm 133 fixed to the hammer carrying shaft 129. The terminals of the coil for the magnet are connected with a source of electricity, shown in a conventional manner as a battery A, by conductors 134, 135 with a pair of contacts 136 of a circuit maker and breaker interposed therein and carried on and insulated from a contact 137 and through which contact the circuit of the magnet is adapted to be opened and closed, diagrammatically shown in Figures 2 and 3. The opening and closing of the circuit is controlled by the movement of the weighing mechanism into perfect balance. For this purpose a bell crank lever 138 is pivotally supported by a bracket upon the shelf of the weighing mechanism, one arm of which is connected by a link 139 with the beam 12, the other arm being arranged to engage between contact makers 136 and when the weighing mechanism is in position of balance permit said contact makers to contact with the contact 137 establishing the circuit of the magnet when the latter is energized drawing its core downward and thereby rocking the hammer carrying shaft and impinging the hammer against the digit wheels of the register.

The hammer actuating mechanism is also adapted for the actuating of the shifter 84 for the sleeve 81 on the arm 82 of the clutch shifter to move said sleeve 81 to cam releasing position, said shifter 84 being normally urged to position to release said sleeve from the cam by a spring 140 attached at one end to a pin extending laterally from the shifter and at the opposite end to a pin fixed in and extending laterally from the standard 61 for the shifter. In this arrangement as shown in Figures 1 and 4 to 7, inclusive, the actuating lever 86 for the shifter is in the form of an angle lever the end of one arm of which is bifurcated for the engagement of a pin extending laterally from the shifter, as at 141, said lever being retained in position with the sleeve in position to be engaged by the cam 88 by a latch 142 co-operating with the other arm of the lever 86, as shown in Figures 4 and 6, this latch being connected by a link 143 with one arm of a lever 144 the other arm of which lever is arranged as a hand grip and normally urged by spring 145 into engagement with a pin 146 in line with and contiguous to an extension of the core of the magnet. As the magnet is energized by the closing of its circuit as the weighing mechanism is brought into perfect balance the extended magnet core will strike against the hand grip carrying arm of the lever 144 moving the same against the tension of spring 145 releasing the latch 142 from the lever 86 when the spring 140 will move the shifter rod 84 to adjust the sleeve 81 on the arm 82 of the clutch shifter to release the cam 88 and permit of the clutch to move to operative position to connect the shaft 66 with the driving means 43. To prevent the actuation of the impression or record making means during the operation of the article transferring means the contacts 136 and thereby the magnet are connected in circuit with contacts 147 of circuit making and breaking means and the circuit being established through said contacts by a blade contact 148 carried by and insulated from the lever 86 when the latter is in position to hold the shifter 84 in position with the sleeve to be engaged by the cam 88.

As a further assurance that the record making means will not be operated when no articles are being transferred to the weighing mechanism a further contact maker and breaker is interposed in the conductor 134 to be controlled by an article upon the support 38. For this purpose a pair of contacts 148 (Figure 3) are mounted on and insulated from the bracket 42 for the article stop 41, said stop instead of being fixed being pivotally supported by the bracket and carries a contact making blade 149 in insulated relation thereto to make contact with the contacts 148. The stop 41 is so arranged that it will normally assume a position by gravity to move the blade 149 out of contact with the contacts 148. However, as an article is delivered from the conveyer to the supporting rollers 38 it is moved by said rollers into engagement with the stop and forces said stop to position with the contact blade 149 in contact with the contacts 148.

In Figures 8 and 9 there is illustrated a modified arrangement of the automatic weighing and article transferring means wherein the articles are manually placed upon the support 38 and removed from the support 100. In this arrangement the support 38 is in the form of parallel and spaced members extending upward from the supporting shelf S for the weighing mechanism and located at one side of and in parallel relation to the parallel and spaced members 40 extending upwardly from the article receiver of the weighing mechanism, and between which members the transfer bars 53 of the transferring means operate to transfer an article from said support placed thereon manually to said receiver of the weighing mechanism. The support or table 100 to which the articles are transferred from the weighing mechanism is also arranged with parallel and spaced members 150 extending upwardly therefrom in parallel relation to the members 40 of the receiver of the weighing mechanism and in the spaces between which members the transfer bars 53 are adapted to operate. The transfer bars in this arrangement are not provided with the downwardly and forwardly extended portions 53$^b$, 53$^a$, as in Figure 13, and to operatively connect the same with the actuating means for said transfer bars the slideway 72 for the engagement of the pin 70 fixed in the disk 71 eccentric to the axis of shaft 66 is in the form of a slotted arm fixed to the forward transfer bars 53 and extending downward therefrom and in the slot of which arm the pin 70 engages. In the operation of the apparatus the sleeve 81 is adjusted on the clutch shifter arm 82 to the position shown in Figure 10 to be engaged by the cam 88 by the lever 86, this latter lever being retained in such position by the latch 142. To start the apparatus the lever 86 in the arrangement shown in Figures 8 and 9 is moved by the hand grip connected to said lever to said position, and in the arrangement shown in Figure 1, and 4 to 7, the latch 142 is released from the lever 86 by manipulation of the lever 144 through the hand grip connected thereto the spring 140 moving the shifter rod 84 to position the sleeve 81 out of engagement with the cam 88, thereby releasing the clutch shifter and permitting the clutch member 76 to be moved into clutching engagement with the clutch member 75 by the spring 77 connecting the shaft 66 with the driver shaft 43. As a one-half rotation is imparted to the shaft 66 the shifter actuating cam 88 is brought into engagement with a pin or roller 84' carried by and extending laterally from the shifter bar 84 moving said shifter in a direction reverse to that in which it was moved to release the clutch shifter and again positioning the sleeve 81 in the path of movement of the cam 88 and for engagement thereby upon the shaft making a complete revolution thereby actuating the clutch shifter and moving the clutch member 76 to releasing position. The shifter rod is retained in such position in the arrangement of Figures 1 and 4 to 7 by the latch 142 which is moved to position below the one arm of the lever 86 through the action of the spring 145. The movement of the shifter bar 84 is limited by pins 85' fixed in and extending laterally from said shifter bar engaging with the shifter bar supports 85.

To adjust the weighing mechanism to compensate for variations effected therein through atmospheric condition or otherwise, and to also balance off tare weights, such as containers for the articles weighed, counterbalancing weights 24' are adjustably mounted upon the auxiliary beam 24.

It will be obvious that various modifications may be made in construction and arrangement of parts, and that portions of the invention may be used without others without departing from the scope of the invention.

Having thus described my invention I claim:

1. The combination with weighing mechanism, of an article support, article transferring means operative to lift an article from said support and transport the article to and deposit it on the weighing mechanism and return the same to initial position, and means to render said article transferring means operative and render the same inoperative when returned to initial position.

2. The combination with weighing mechanism arranged with an article receiver, of article supports at opposite sides of the receiver of the weighing mechanism, article transferring means operative to lift an article from one support and transport the article to and deposit it on the receiver of the weighing mechanism and return the same to initial position, said article transferring means being operative to simultaneously lift an article from the receiver of the weighing mechanism and transport such article to and deposit it on the support at the opposite side of the receiver of the weighing mechanism.

3. The combination with weighing mechanism, of an article support, article transferring means operative to lift an article from said support and transport the article to and deposit it on the weighing mechanism to be weighed and simultaneously lift a weighed article and deliver the same from the weighing mechanism, driving means, and means to releasably couple the driving means with the transferring means to intermittently actuate the latter.

4. The combination with weighing mechanism, of an article support, article transferring means operative to lift an article from said support and transport the article to and deposit it on the weighing mechanism and simultaneously lift an article and deliver the same from the weighing mechanism, driving means normally uncoupled from said transferring means, and means operative to couple the driving means with the transferring means and after an article transferring movement has been imparted to said transferring means automatically uncouple the same from the driving means.

5. The combination with weighing mechanism, of an article support, article transferring means operative to lift an article from said support and transport the article to and deposit it on the weighing mechanism and simultaneously lift an article and deliver the same from the weighing mechanism, actuating means for said transferring means, driving means, clutch mechanism to connect the driving means with the transferring means, means operative from the actuating means to actuate the clutch mechanism to uncouple the driving means from the actuating means, means to release the clutch mechanism from its actuating means and the coupling of the driving means with the actuating means, said clutch actuating means being operative upon the completion of an article transferring movement of the transferring means to actuate the clutch releasing means to release the driving means from the actuating means for the transferring means.

6. Article transferring means as claimed in claim 4, wherein the weighing mechanism is arranged with an article receiver and said receiver and the article support having parallel and spaced members extending upward therefrom, and the transferring means comprising bars connected in parallel and spaced relation normally positioned within the spaces between the parallel members of the receiver and article support and adapted to have movement outward therefrom to engage and lift an article from the support and longitudinal movement in said position to position the article relative to the receiver, then downward movement into said spaces to deposit the article on the receiver and longitudinal reverse movement within the spaces to initial position.

7. The combination of weighing mechanism having an article receiver arranged with parallel and spaced members extending upward therefrom, an article support juxtaposed to and arranged with upwardly extending parallel and spaced members in alinement with the members of the receiver, means to transfer an article from the support to the receiver of the weighing mechanism comprising parallel and spaced bars normally engaging within the spaces between the parallel members of the support and receiver and adapted to have upward outward movement from said spaces, longitudinal forward movement, and then movement into the spaces and rearward longitudinal movement, and means to actuate said article transferring means.

8. Article transferring means as claimed in claim 7, wherein the means to impart the longitudinal forward and rearward movement to the transferring means comprises a rotatable shaft, a pin carried by said shaft eccentric to the axis thereof, and an arm fixed to and extending downward from the bars of the transferring means arranged with a slot for the engagement of said pin.

9. Article transferring means as claimed in claim 7, wherein the means to impart the movement of the bars of the transferring means upward and outward from and into the spaces between the members of the parallel members of the support and receiver comprises a rotatable shaft, a pair of interconnected rocker arms arranged forwardly and rearwardly of and carrying rollers for engagement below and with the bars of the transferring means, and means operative from the shaft to impart said movement to the transferring means.

10. Article transferring means as claimed in claim 7, wherein the means to actuate the transferring means comprises a rotatable shaft, a pin carried by said shaft eccentric to the axis thereof for engagement in a slot of an arm fixed to and extending downward from the bars of the transferring means, and interconnected rocker arms arranged at the forward and rearward ends of and carrying means for engagement below and with the bars of the transferring means, and a connection between said arms and the shaft to impart upward and downward movement to the transfer bars in timed sequence with the forward and rearward movement thereof.

11. Article transferring means as claimed in claim 7, wherein the means to actuate the transferring means comprises a rotatable shaft, a pin carried by said shaft eccentric to the axis thereof for engagement in a slot of an arm fixed to and extending downward from the bars of the transferring means, and interconnected rocker arms arranged at the forward and rearward ends of and carrying means for engagement below and with the bars of the transferring means, and a connection between said arms and the shaft to impart upward and downward movement to the transfer bars in timed sequence with the forward and rearward movement thereof, driving means, releasable means to connect the driving means with the shaft, and means operative from the rotation of the shaft to control said connection.

12. The combination of weighing mechanism having an article receiver arranged with parallel and spaced members extending upward therefrom, an article support juxtaposed to and arranged with upwardly extending parallel and spaced members in alinement with the members of the receiver, means to transfer an article from the support to the receiver of the weighing mechanism comprising parallel and spaced bars normally engaging within the spaces between the parallel members of the support and receiver and adapted to have upward outward movement from said spaces, longitudinal forward movement, and then movement into the spaces and rearward longitudinal movement, means to actuate said article transferring means, driving means, means to releasably connect the driving means with the actuating means, and means operative from the actuating means to control said connection.

13. Article transferring means as claimed in claim 12, wherein the actuating means comprises a rotatable shaft, a pin carried by said shaft eccentric to the axis thereof engaging a slot in an arm fixed to the bars of the transferring means, a pair of interconnected rocker arms carrying means below and for engagement with the bars of the transferring means, a cam on said shaft, and a cam follower connected to said rocker arms.

14. The combination of weighing mechanism arranged with an article receiver having parallel recesses therein, an article support juxtaposed to and arranged with recesses in alinement with the recesses in the article receiver of the weighing mechanism, article transferring means embodying parallel and spaced bars normally engaged within the recesses of the receiver and support adapted to have movement outward from the recesses, longitudinal forward movement, then movement into the recesses and longitudinal rearward movement, a rotatable shaft carrying a pin eccentric to the axis thereof engaging a slot in an arm fixed to the transfer bars to impart the forward and rearward longitudinal movement thereto, interconnected rocker arms carrying means arranged below and for engagement with the transfer bars adjacent the forward and rear ends for imparting movement outward from and into the recesses of the receiver and support, a cam on the shaft, a follower to co-operate with said cam connected to the rocker arms, driving means for the shaft, means to releasably connect the driving means with the shaft, and means operative from the rotation of the shaft to control said connection.

15. Article transferring means as claimed in claim 14, wherein the means to releasably connect the shaft with the driving means comprises a clutch member loose on the shaft operatively connected with the driving means, and a clutch member to co-operate with the first clutch member rotatable with and slidable on the shaft and normally urged into operative connection with the first clutch member.

16. Article transferring means as claimed in claim 14, wherein the means to releasably connect the shaft with the driving means comprises a clutch member loose on the shaft operatively connected with the driving means, a clutch member to co-operate with the first clutch member rotatable with and slidable on the shaft and normally urged into operative connection with the first clutch member, and the means to control the connection of the shaft with the driving means embodying a shifter co-operating with the slidable clutch member, and a cam rotatable with the shaft to co-operate with said shifter to impart clutch releasing movement to said slidable clutch member upon each revolution of the shaft.

17. Article transferring means as claimed in claim 14, wherein the means to releasably connect the shaft with the driving means comprises a clutch member loose on the shaft operatively connected with the driving means, a clutch member to co-operate with the first clutch member rotatable with and slidable on the shaft and normally urged into operative connection with the first clutch member, and the means to control the connection of the shaft with the driving means embodying a shifter arm pivotally supported to have movement on an axis transverse to the axis of the shaft operatively connected with the slidable clutch member and having an arm extending oppositely from its connection with said clutch member, a roller mounted on said shifter arm to have rotative and longitudinal movement thereon, a cam rotatable with the shaft, a shifter to adjust the roller on the arm of the clutch shifter to position for engagement by said latter cam to actuate the clutch shifter to move the slidable clutch member to releasing position, said shifter being operative to move the roller out of engagement with the cam and release the clutch shifter and having means to co-operate with said cam to move the roller to cam engaging position.

18. The combination with automatic weighing mechanism arranged with an article receiver, of an article support arranged at one side of said receiver, article transferring means operative to lift an article from the support and transport the article to and deposit it on the receiver of the weighing mechanism, means to render the transferring means inactive when an article has been transferred to the receiver of the weighing mechanism and adapted to render said actuating means active and actuate the transferring means when the weighing mechanism is brought into balance with the article to lift and deliver the article from the weighing mechanism and transfer another article from the support to the weighing mechanism.

19. In weighing mechanism as claimed in claim 18, a second support, weight recording mechanism arranged relative to said latter support and means to render said recording mechanism operative by the bringing of the weighing mechanism into balance to make a record of the weight of the article on the weighing mechanism and relative to which second support the article is transferred from the weighing mechanism by the transferring means upon the successive actuation thereof.

20. In weighing mechanism as claimed in claim 18, a second support, weight registering mechanism mounted on said latter support and relative to which mechanism a wrapping sheet is adapted to be positioned upon the support, means operative from the weighing mechanism to actuate said registering mechanism by the movement thereof to position of balance, means rendered operative by the bringing of the mechanism into position of balance to make an impression from the registering mechanism upon the sheet upon said support, the article on the weighing mechanism being adapted to be transferred to the sheet upon said support from the weighing mechanism by the transferring means upon the successive actuation thereof.

21. Weighing mechanism as claimed in claim 18, wherein the transferring means has an intermittently upward movement to lift an article from the support, forward movement to position the article above the receiver of the weighing mechanism, downward movement to deposit the article on the receiver of the weighing mechanism and rearward movement to initial position.

22. In weighing mechanism as claimed in claim 18, a second support to which an article is adapted to be transferred from the weighing mechanism by the transferring means upon the successive actuation thereof, and a conveyer arranged in relation to said second support to transfer an article from said support.

23. The combination with automatic weighing mechanism arranged with an article receiver, of an article support adjacent the receiver of the weighing mechanism, article transferring means operative to lift an article from the support and transport the article to and deposit it on the receiver of the weighing mechanism, actuating means for said transferring means, driving means for the actuating means, means to connect and disconnect the actuating means from the driving means, means operative from the actuating means to disconnect the actuating means from the driving means when an article has been transferred to the receiver of the weighing mechanism, and electrically controlled means operative by the bringing of the weighing mechanism into balance with the article thereon to render the disconnecting means inoperative and the connection of the driving means with the actuating means for the transferring means.

24. In weighing mechanism as claimed in claim 18, a conveyer arranged relative to the receiver of the weighing mechanism, said transferring means having an intermittent upward movement to lift articles from the support and receiver of the weighing mechanism, a forward movement to position an article from the support to the receiver and from the latter in superposed relation to the conveyer, a downward movement to deposit an article on the receiver of the weighing mechanism and a rearward movement to initial position, and a stripper positioned during the downward movement of the transferring means in the rear of the article thereon positioned above the conveyer and adapted to engage with and move the article from the transferring means to the conveyer during the rearward movement of the transferring means.

25. The combination with weighing mechanism having an article receiver, of an article conveyer, a series of rotatable rollers interposed between the conveyer and the receiver of the weighing mechanism and to which rollers an article is delivered from the conveyer and positioned by the rollers relative to a fixed stop, and intermittently operative means to transfer an article from said rollers to the receiver of the weighing mechanism and from the latter.

26. In weighing mechanism as claimed in claim 25, a second conveyer, said transferring means being operative to successively transfer an article from the rollers to the receiver of the weighing mechanism and from the latter to the second conveyer.

27. In weighing mechanism as claimed in claim 25, a second conveyer, said transferring means in its cycle of movements having an upward movement to lift articles from the rollers and receiver of the weighing mechanism, a forward movement to position the article on the rollers relative to the receiver of the weighing mechanism and the article on the latter in superposed relation to the second conveyer, a downward movement to deposit an article on the receiver of the weighing mechanism, and a rearward movement to initial position, and a stripper positioned during the downward movement of the transferring means and operative during the rearward movement of the transfer means to engage and deliver an article from the transferring means to the second conveyer.

28. In weighing mechanism as claimed in claim 25, stop mechanism to intercept the delivery of articles from the conveyer to the rollers when an article is upon said rollers and moved out of the path of movement of an article from the conveyer when an article on the roller has been transferred to the receiver of the weighing mechanism.

29. In weighing mechanism as claimed in claim 18, a second support to which an article is transferred from the weighing mechanism by the transferring means, weight registering mechanism arranged relative to said second support, actuating means for said registering means operative from the weighing mechanism as it is brought into balance, and means rendered active by the bringing of the weighing mechanism into balance to make an impression from the registering mechanism and record of the weight of an article on the receiver of the weighing mechanism.

30. In weighing mechanism as claimed in claim 18, a second support to which articles transferred from the weighing mechanism by the transferring means are delivered, weight registering mechanism arranged relative to said second support and embodying a series of operatively connected digit wheels, a pair of linear movable racks having a connection with the prime mover of the registering mechanism and operative by the movement of the weighing mechanism to position of balance to actuate the registering mechanism, a hammer normally positioned away from the registering mechanism and adapted to have movement toward and away from said mechanism, and means rendered active to actuate said hammer when the weighing mechanism is brought into balance to make an impression from the registering mechanism and record of the weight of an article on the receiver of the weighing mechanism.

31. In weighing mechanism as claimed in claim 18, a second support to which articles transferred from the weighing mechanism by the transferring means are delivered, weight registering mechanism arranged relative to said second support and embodying a series of operatively connected digit wheels, a pair of linear movable racks having a connection with the prime mover of the registering mechanism and operative by the movement of the weighing mechanism to position of balance to actuate the registering mechanism, a hammer normally urged to position away from the registering mechanism, and electromagnetically operated means rendered active when the weighing mechanism is brought to balance to move the hammer against the digit wheels of the registering mechanism to make an impression therefrom and a record of the weight of an article on the weighing mechanism.

32. Weighing mechanism as claimed in claim 25, wherein the article supporting rollers are arranged in parallel spaced relation and in line with parallel spaced members extending upward from the receiver of the weighing mechanism, and the transferring means comprises a series of connected parallel and spaced bars arranged in the spaces between the rollers and said members and normally positioned below the surface thereof and adapted to be moved outward and above said rollers and members, longitudinally forward, downward below the surface of said rollers and members, and then rearwardly to transfer an article from the rollers to the receiver of the weighing mechanism and from the latter.

33. The combination with automatic weighing mechanism arranged with a receiver for an article to be weighed, of an article support adjacent the receiver of the weighing mechanism, means to transfer an article from the support to the receiver, said transferring means having an upward movement to lift articles from the support and receiver of the weighing mechanism, forward movement in its elevated position to transfer articles from the support to the receiver of the weighing mechanism and from the latter, downward movement to deposit articles upon the receiver of the weighing mechanism, and rearward movement to initial position when in its lowered position, a rotatable shaft, a pin and slideway connection between the shaft and transfer means to impart the forward and rearward movements to said transferring means, means to support the transferring means operative from the shaft to impart upward and downward movement to the transferring means, driving means, means to releasably connect the driving means with the shaft to intermittently actuate the latter, means operative from the shaft to control the disconnecting of the shaft from the driving means, and means rendered active by the bringing of the weighing mechanism into balance to control the connecting of the shaft with the driving means.

34. Weighing mechanism as claimed in claim 33, wherein the pin and slideway connection between the shaft and transferring means comprises a pin carried by the shaft eccentric to the axis thereof, and an arm fixed to the transferring means having a slot therein for the engagement of said pin.

35. Weighing mechanism as claimed in claim 33, wherein the means to support and impart upward and downward movement to the transferring means comprises a pair of rock shafts including arms fixed thereto having connection with the transferring means, a cam on the shaft, and a cam follower carried by one of the arms to co-operate with said cam.

36. Weighing mechanism as claimed in claim 33 wherein the means to releasably connect the shaft with the driving means comprises a clutch one member of which is loose on the shaft and operatively connected with the driving means, and the other clutch member mounted on the shaft to rotate therewith and have longitudinal movement thereon and normally urged to operative position, a shifter for said latter clutch member, and means rotatable with the shaft to co-operate with said shifter when the transferring means has completed a cycle of operations to move the one clutch member to inoperative position.

37. Weighing mechanism as claimed in claim 33, wherein the means to releasably connect the shaft with the driving means comprises a clutch one member of which is loose on the shaft and operatively connected with the driving means, and the other clutch member mounted on the shaft to rotate therewith and have longitudinal movement thereon and normally urged to operative position, a shifter having an operative connection with said latter clutch member arranged with an arm extending laterally of its connection with the clutch member, a sleeve having an annular recess rotatable with and slidable on said shifter arm, a cam rotatable with the shaft adapted to co-operate with said sleeve when the transferring means has completed a cycle of operations to actuate the shifter and move the one clutch member to inoperative position.

38. Weighing mechanism as claimed in claim 33, wherein the means to releasably connect the shaft with the driving means and the controlling of the connection with the shaft with the driving means rendered active by the bringing of the weighing mechanism into balance, comprises a clutch one member of which is loose on the shaft and operatively connected with the driving means and the other clutch member mounted on the shaft to rotate therewith and have longitudinal movement thereon and normally urged to operative position, a shifter having operative connection with said latter clutch member arranged with an arm extending laterally of its connection with the clutch member, a sleeve rotatable with and slidable on said shifter arm, a cam rotatable with the shifter to co-operate with said sleeve when the transferring means has completed a cycle of operations to actuate the shifter and move the one clutch member to inoperative position, a second shifter having a connection with the sleeve on the shifter arm to impart longitudinal movement thereto and normally urged to position to move said sleeve out of engagement with the cam to release the clutch shifter and permit movement of the clutch member to operative position, means carried by said second shifter with which the cam co-operates to move the same to position the sleeve on the shifter arm for engagement by the cam to actuate the clutch shifter, latch mechanism to releasably retain the second shifter in said position, an electromagnetically operated means controlled by the movement of the weighing mechanism to position of balance to actuate the latch mechanism to release the second shifter and thereby the clutch shifter with its actuating cam.

39. The combination with automatic weighing mechanism arranged with a receiver for an article to be weighed, of an article support, means to transfer an article from the support to the receiver of the weighing mechanism, a rotatable shaft having operative connection with said transferring means to actuate the same, driving means, clutch mechanism one member of which is loose on the shaft and connected with the driving means and the other member rotatable with and slidable on the shaft and normally urged to operative clutching position, a clutch shifter, a cam rotatable with the shaft to co-operate with said shifter after an article transferring movement has been transmitted to said transferring means to actuate the clutch to release the shaft from the driving means, and means controlled by the movement of the weighing mechanism to position of balance operative to release the shifter from said cam and permit movement of the one clutch member to operative position to connect the shaft and transferring means with the driving means for operation thereby.

40. In weighing mechanism as claimed in claim 39, an abutment adjustably carried by the clutch shifter adapted to be moved into the path of movement of the clutch shifter actuating cam for engagement by the cam to move the clutch member to inoperative position and out of the path of movement of said cam to release the shifter therefrom.

41. In weighing mechanism as claimed in claim 39, an abutment adjustably carried by the clutch shifter adapted to be moved into the path of movement of the clutch shifter actuating cam for engagement by the cam to move the clutch member to inoperative position and out of the path of movement of said cam to release the shifter therefrom, and wherein the means to release the shifter from the cam comprises a second shifter connected with the abutment on the clutch shifter and normally urged to position to move the abutment out of the path of movement of the clutch shifter actuating cam, said second shifter being adapted to be actuated by said cam during the movement of the transferring means to position the abutment on the clutch shifter into the path of movement of the cam, and a spring influenced latch co-operating with said second shifter to retain it in position with the abutment in cam engaging position.

42. In weighing mechanism as claimed in claim 39, an abutment adjustably carried by the clutch shifter adapted to be moved into the path of movement of the clutch shifter actuating cam for engagement by the cam to move the clutch member to inoperative position and out of the path of movement of said cam to release the shifter therefrom, a second shifter connected with the abutment urged to position with the abutment out of the path of movement of the clutch shifter actuating cam and adapted to be actuated by said cam by the rotation of the shaft during the operation of the article transferring means to move the abutment into the path of movement of the cam, and a pivoted latch normally urged to position to co-operate with the second shifter to retain it in said latter position, and wherein the means controlled by the movement of the weighing mechanism to position of balance to release the clutch shifter from the cam comprises a solenoid magnet connected in an electric circuit having circuit making and breaking means connected therein normally urged to circuit closing position, means connected with the weighing mechanism to co-operate with said circuit making and breaking means to open the circuit when the weighing mechanism is out of balance and permit said circuit making and breaking means to move to circuit closing position, and the core of the magnet adapted to co-operate with the latch to release the same from the second shifter when the circuit of the magnet is closed by the weighing mechanism moving into balanced position.

43. In weighing mechanism as claimed in claim 39, an abutment adjustably carried by the clutch shifter adapted to be moved into the path of movement of the clutch shifter actuating cam for engagement by the cam to move the clutch member to inoperative position and out of the path of movement of said cam to release the shifter therefrom, a second shifter connected with the abutment urged to position with the abutment out of the path of movement of the clutch shifter actuating cam and adapted to be actuated by said cam by the rotation of the shaft during the operation of the article transferring means to move the abutment into the path of movement of the cam, and a pivoted latch normally urged to position to co-operate with the second shifter to retain it in said latter position, and wherein the means controlled by the movement of the weighing mechanism to position of balance to release the clutch shifter from the cam comprises electromagnetically actuated means.

44. The combination with automatic weighing mechanism having a receiver for an article to be weighed, of an article support, a conveyer to transport and deliver articles successively to said support, intermittently operative means to transfer an article from the support to the receiver of the weighing mechanism, means to render said transferring means operative when an article has been transferred to the weighing mechanism, means controlled by the movement of the weighing mechanism into balance to render the transferring means operative, a second conveyer to which an article is transferred from the weighing mechanism upon the successive operation of the transferring means and as a successive article is transferred to the weighing mechanism, and means to actuate said conveyer from the article transferring means.

45. The combination with automatic weighing mechanism having a receiver for an article to be weighed, of an article support, a conveyer to transport and deliver articles successively to said support, means to transfer an article from the support to the receiver of the weighing mechanism, a rotatable shaft having an operative connection with said transferring means to actuate the same, driving means, clutch mechanism one member of which is loose on the shaft and connected with the driving means and the other clutch member rotatable with and slidable on the shaft and normally urged to operative clutching position, a clutch shifter, means operative from the shaft to co-operate with said shifter after an article transferring movement of the transferring means to actuate the clutch to release the shaft from the driving means, means controlled by the movement of the weighing mechanism into balance to release the clutch shifter and clutch for connection of the shaft and transferring means with the driving means to impart a successive movement to the transferring means, a second conveyer to which an article is transferred from the weighing mechanism by the transferring means upon the successive movement thereof and the transferring of a successive article to the weighing mechanism, and means to actuate said second conveyer from the shaft.

46. Weighing mechanism as claimed in claim 45, wherein the means to actuate the second conveyer from the shaft comprises gearing connected with a supporting drum for the conveyer and having a ratchet wheel associated therewith, a rocker arm carrying a pawl to co-operate with the ratchet wheel, a cam on the shaft, and a link connected with the pawl carrying arm and carrying a follower to co-operate with the cam on the shaft.

47. In weighing mechanism as claimed in claim 44, a second support to which an article is transferred from the weighing mechanism and relative to which the second conveyer is movable to transfer an article from said support, and registering mechanism operative from the weighing mechanism as it is brought into balance to register the weight of an article weighed.

48. In weighing mechanism as claimed in claim 44, a second support to which an article is transferred from the weighing mechanism and relative to which the second conveyer is movable to transport an article from said support, registering mechanism mounted upon said second support and relative to which a wrapping sheet is adapted to be positioned upon said support, said registering mechanism being operative from the weighing mechanism as it is brought into balance to register the weight of an article on the weighing mechanism, and means to make a record upon the wrapping sheet from the registering mechanism rendered active when the weighing mechanism is brought into balance simultaneously with the means to render the transferring means active.

49. In weighing mechanism as claimed in claim 44, a second support to which an article is transferred from the weighing mechanism and relative to which the second conveyer is movable to transport an article from said support, registering mechanism mounted upon said second support and relative to which a wrapping sheet is adapted to be positioned upon said support, said registering mechanism being operative from the weighing mechanism as it is brought into balance to register the weight of an article on the weighing mechanism, and means to make a record upon the wrapping sheet from the registering mechanism rendered active when the weighing mechanism is brought into balance simultaneously with the means to render the transferring means active, and wherein the means to render the transferring means active when the weighing mechanism is brought into balance comprises electromagnetically operated means, and said electromagnetically operated means is operative to actuate the record making means.

50. The combination with automatic weighing mechanism having a receiver for an article to be weighed, of intermittently operative means to transfer an article to said receiver of the weighing mechanism, weight registering and recording mechanism, means rendered active by the bringing of the weighing mechanism into balance for actuating said registering and recording mechanism and rendering the transferring means active to transfer an article from the weighing mechanism and another article to the weighing mechanism.

51. The combination with automatic weighing mechanism having a receiver for an article to be weighed, of intermittently operative means to transfer an article to said receiver of the weighing mechanism and rendered inoperative when an article has been transferred to the weighing mechanism, weight registering mechanism, means to actuate said registering mechanism operative from the weighing mechanism by the movement thereof into balance, means to make a record of the weight from said registering mechanism, means to actuate the record making means rendered active when the weighing mechanism is brought into balance, and said latter means being operative to render the transferring means active to transfer a weighed article from the weighing mechanism and transfer another article to the latter.

52. The combination with automatic weighing mechanism having a receiver for an article to be weighed, of means to transfer an article to said receiver of the weighing mechanism, driving means therefor, means to disconnect the transferring means from the driving means when an article has been transferred to the receiver of the weighing mechanism, weight registering mechanism operative from the weighing mechanism by the movement thereof into balance, means to make a record of the weight of an article from said registering means, and means to control the actuation of the recording means operative by the movement of the weighing mechanism into balance, said means also controlling the connecting of the driving means with the transferring means to actuate the latter to transfer a weighed article from the weighing mechanism and transfer another article thereto.

Signed at Passaic, N. J., in the county of Passaic and State of New Jersey, this 16th day of February A. D. 1927.

FRANK S. HEBDEN.